H. B. SIMONDS.
Attaching Hubs to Axles.
No. 14,371.  Patented Mar. 4, 1856.
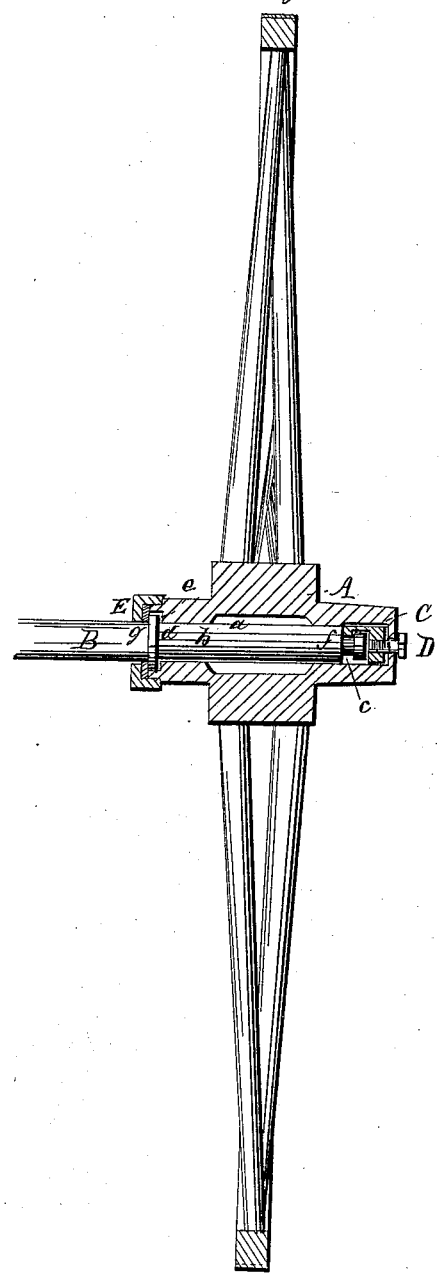

UNITED STATES PATENT OFFICE.

HORACE B. SIMONDS, OF WEST HARTFORD, VERMONT.

MODE OF ATTACHING HUBS TO AXLES.

Specification of Letters Patent No. 14,371, dated March 4, 1856.

*To all whom it may concern:*

Be it known that I, HORACE B. SIMONDS, of West Hartford, in the county of Windsor and State of Vermont, have invented a new and Improved Mode of Attaching Hubs to Axles; and I do hereby declare that the following is a full, clear, and exact description of the same, reference being had to the annexed drawings, making a part of this specification, in which—

Figure 1 is a section of a wheel and hub, the hub being attached to its axle by my improved mode. Fig. 2 is an end view of the clutch box.

Similar letters of reference indicate corresponding parts in the two figures.

This invention relates to a new and improved mode of attaching hubs to axles whereby the hub may be readily attached to and detached from the axle and dust prevented from entering the hub as will be presently shown and described.

To enable those skilled in the art to fully understand and construct my invention, I will proceed to describe it.

A, Fig. 1, represents the hub of a wheel, which may be constructed of metal or wood. The hub has the usual hole (*a*), made longitudinally in its center to receive the arm (*b*) of the axle B, said hole (*a*) extending nearly to the front end of the hub. The arm (*b*), near its outer end, has a groove (*c*), made in or around it, and the back end of the arm has a collar (*d*), upon it, which collar fits in a recess (*e*), in the back end of the hub.

C represents a clutch or clutch box which is fitted in the hole (*a*), in the hub, near its front end, that is when the arm is inserted in the hub. This clutch is cylindrical at its outer end, and its inner end or part is semi-cylindrical, and is hollowed or scooped out so as to receive the outer end of the arm, the end of the semi-cylindrical part having a flanch (*f*), on it, which flanch fits in the groove (*c*), in the arm, see Fig. 1.

D, is a screw which passes through the outer end of the hub and into the outer end of the clutch C. The screw D secures the clutch to the hub, and the clutch secures the arm within the hole (*a*) of the hub.

E, is a cap or box which is fitted over the back end of the hub A, in any proper manner and (*g*), is a washer of india-rubber or other suitable material which is placed over the collar (*d*). The washer (*g*), as well as the cap or box E, is placed upon the back part of the arm (*b*), the arm passing through them. By means of the washer and cap or box dust is prevented from working into the hub. The hub may be readily withdrawn from the arm by taking out the screw D. When the hub is to be attached to the arm, the clutch, of course, is fitted on the end of the arm before the hub is placed on it.

The above improvement is extremely simple and durable. A space is formed in consequence of the semi-cylindrical form of the inner end of the clutch, in which space the lubricating material may collect, and be thereby prevented from oozing out at the ends of the hub.

Having thus described my invention what I claim as new and desire to secure by Letters Patent, is,

Securing the hub, A, upon the arm, (*b*), by means of the clutch, C, screw, D, and cap or box, E, the inner end of the clutch being of semi-cylindrical form, and having a flanch, (*f*), on it, which flanch is fitted in a groove, (*c*), in the outer end of the arm; the screw, D, passing through the outer end of the hub into the clutch, and the back part of the arm having a collar (*d*) upon it which collar is fitted in the back end of the hub, said collar being covered by a cap or box, E, having a washer, (*g*), within it, substantially as shown and described.

HORACE B. SIMONDS.

Witnesses:
GUY C. SAMPSON,
JOHN FULLER.